United States Patent [19]

Samyn

[11] Patent Number: 4,919,574
[45] Date of Patent: Apr. 24, 1990

[54] TOOL HOLDER RETENTION SYSTEM

[75] Inventor: Russell H. Samyn, Rolling Meadows, Ill.

[73] Assignee: Illinois Tool Works Inc., Glenview, Ill.

[21] Appl. No.: 331,196

[22] Filed: Mar. 31, 1989

[51] Int. Cl.5 .................................... B23B 31/02
[52] U.S. Cl. ................................ 409/219; 279/1 L; 279/67; 408/239 R; 409/234
[58] Field of Search .............. 409/219, 221, 232, 234; 279/1 L, 16, 17, 67, 68, 112; 192/108; 408/238, 239 R, 239 A, 240

[56] References Cited

U.S. PATENT DOCUMENTS

| | | | |
|---|---|---|---|
| 1,873,476 | 8/1932 | Procunier | 279/67 |
| 2,485,799 | 10/1949 | Woytych | 279/67 |
| 4,307,797 | 12/1981 | Belansky | 74/459.5 |
| 4,575,293 | 3/1986 | Berti | 409/234 |
| 4,655,655 | 4/1987 | Schurfeld | 409/232 |
| 4,784,543 | 11/1988 | Mitchell et al. | 409/234 |

FOREIGN PATENT DOCUMENTS 241011 10/1986 Japan .................................... 409/234

Primary Examiner—Daniel Howell
Attorney, Agent, or Firm—Richard Bushnell

[57] ABSTRACT

A tool or workpiece holder retention mechanism which engagably retains the holder retention portion of the holder by creating a clamping force which draws the holder retention portion into a cooperatively formed area between two retaining jaws. Two abutting surfaces, one on the holder and one on the abutting surface on the retention mechanism housing, have formed thereon cooperatively engagable surfaces at least one of which is generally spirally formed, which meshedly engage to self-center the tool holder. Preferably the cooperatively engagable surfaces are in the form of mating spiral gear teeth specifically the jaws and the holder retention portion are constructed and actuated so as to be radially freely floatable to avoid interference with the self-centering function of the mating spiral surfaces.

16 Claims, 2 Drawing Sheets

TOOL HOLDER RETENTION SYSTEM

BACKGROUND OF THE INVENTION

This invention relates to a tool holder retention mechanism for retaining a tool or workpiece mounted to a retention plate which has a tool holder knob portion formed thereon. While the present invention may have applications other than the retentions of tool holders, the ensuing description will be facilitated by specific reference to the problem of providing a tool holder retention mechanism.

Substantial fabrication of manufactured parts is accomplished through rotary machine operations such as lathe work, rotary material removal devices and rotary drilling devices. In such operations either the material is mounted to a surface to rotate the material for working the material or the tool is mounted to a rotary device to work the material to a desired state.

In these operations the mounting and removal of the tools or workpiece can require a substantial amount of time. For example, in a lathe operation a substantial amount of time is taken in preparing the workpiece for mounting to the rotary material holding base. Also, the non uniformity of the mounting portion of tools requires adjustment of the tool retention mechanism in order to most securely retain the tool in the rotary portion.

Typical prior art tool retention mechanisms involve the use of a "chuck" which is formed with two or three jaw mechanisms which are movably engagable to retain a tool holder knob portion. While the "chuck" provides adjustability in securing the knob portion for rotation it creates a problem in that if a knob portion is slightly axially misaligned, there is a chance that the shaft of the knob portion will interfere with the inward radial movement of the chuck members when the chuck is tightened to hold the knob portion. Misalignment of the knob portion may result in damage to the tool or the workpiece held thereon.

Another area of tool retention mechanisms developed a device in which slidably movable jaw members were compressibly urged to engage notches formed on the end of a tool holder knob portion. An example of this type of device can be found in U.S. Pat. No. 2,485,799 Woytych. The tool retaining mechanism in Woytych shows two slidably movable jaws which engage notches formed on the end of the shaft of the tool holder knob portion. While the device in Woytych securely holds the tool holder in position, this device also requires that the tool holder be specifically radially aligned or "keyed-in" such that the tool holder jaws engage the notches formed on the end of the shaft of the tool holder knob portion. This method of securing a tool holder within the tool retention mechanism creates a problem in that since the tool holder must be specifically "keyed-in" to be engaged by the tool retention mechanism jaws, the position of the tool holder upon insertion is substantially limited.

Further, the device taught in Woytych is incapable of providing high precision tool holder centering and indexing. In Woytych the tool holder is centered by inserting a generally conical shaft into a generally cooperatively conical bore thereby generally seating the retaining knob portion in the center of the tool retention mechanism. While this device generally provides satisfactory tool holder centering, it has a problem in that any slight irregularities in the surface of the bore or the shaft could dramatically change the center of the tool holder. Additionally, indexing of the device is significantly limited to using the two notches formed on the shaft end.

In order to overcome the centering problem a coupling device has been developed as shown in U.S. Pat. No. 4,307,797 to Belansky. This tool holding device provides gear tooth coupling portions which meshedly engage to center the tool mounted to one of the coupling devices with a high degree of precision. This device, however, does not provide for an efficient method of retaining the coupling portions within a tool retention system. Currently this system uses a mounting portion such as a large threaded member which projects up through the center of one coupling portion to retain that coupling portion to a rotary device.

Manufacturing areas such as the aerospace industry require a high degree of precision in order to achieve the highly precise products which it requires. Additionally, with an increase in manufacturing activity, the aerospace industry has become more automated in its manufacturing operations. As such, many material machining operations have become automated such that workpiece and/or tools are transported to, mounted on and removed from processing machinery by automated devices. To provide greater efficiency and simplicity for the automated devices universal tool holders are desirable and in some applications required and are premounted to a workpiece for processing or are formed or mounted on the mounting end of a tool.

The universal tool holder provides many advantages which include the ability to mount a tool holder to a workpiece such that each time the workpiece is worked on it retains the same axis of rotation as when the tool holder was originally mounted to the workpiece. Further, the uniformity of a universal tool holder allows a single end effector to be used in automated equipment thereby eliminating the need to provide adjustable end effectors thereby making the programming and operation of the automated equipment much less complicated and much more efficient. Additionally, high precision demanding industries, such as aerospace require self-indexing tool holders to decrease the difficulty in positioning a tool or workpiece mounted to a tool retention mechanism.

OBJECTS AND SUMMARY OF THE INVENTION

A general object of the present invention is to provide a tool or workpiece retention mechanism which may be quickly and easily set up and which is self-centering.

A further object of the present invention is to provide a novel retention mechanism which securely retains a holder by clamping opposing jaws against a holder retention portion inserted therein and which has a surface on which spirally formed gear teeth are formed which abut a cooperatively formed gear tooth surface formed on the tool or workpiece holder which is to be held by the mechanism.

Another object of the present invention is to provide a retention mechanism which does not require specific notches on the holder retention portion of a tool or workpiece holder such that the retention portion is not used to key-in the position of the workpiece or the tool mounted to the holder.

A further object of the present invention is to provide a retention mechanism which is self-centering and provides a high degree of precision indexing through cooperatively coupling spirally formed gear teeth which are formed on oppositely facing coupling surfaces of the holder and the retention mechanism.

Yet another object of the present invention is to provide a retention mechanism which can be actuated from the side of the mechanism instead of the rear of the mechanism providing easier installation and adjustment of a holder held therein.

Still another object of the present invention is to provide a retention mechanism which has holder retaining jaws which provide a degree of floatingly variable movement while positioning and retaining a tool holder.

In accordance with the foregoing, the present invention comprises a tool or workpiece holder retention mechanism which engagably retains the holder retention portion of the holder by creating a clamping force which draws the holder retention portion into a cooperatively formed area between two retaining jaws. Two abutting surfaces, one on the holder and one on the abutting surface on a retention mechanism housing, have formed thereon cooperatively engagable surfaces at least one of which is generally spirally formed, which meshedly engage to self-center the tool holder. Preferably the cooperatively engagable surfaces are in the form of mating spiral gear teeth. Specifically, the jaws and the holder retention portion are constructed and actuated so as to be radially freely floatable to avoid interference with the self-centering function of the mating spiral surfaces.

BRIEF DESCRIPTION OF THE DRAWINGS

The features of the present invention which are believed to be novel are set forth with particularity in the appended claims. The organization and manner of operation of the invention, together with the further objects and advantages thereof, may best be understood by reference to the following description taken in connection with the accompanying drawings in which like reference numerals identify like elements in which:

DETAILED DESCRIPTION OF THE ILLUSTRATED EMBODIMENT

Figure 1:
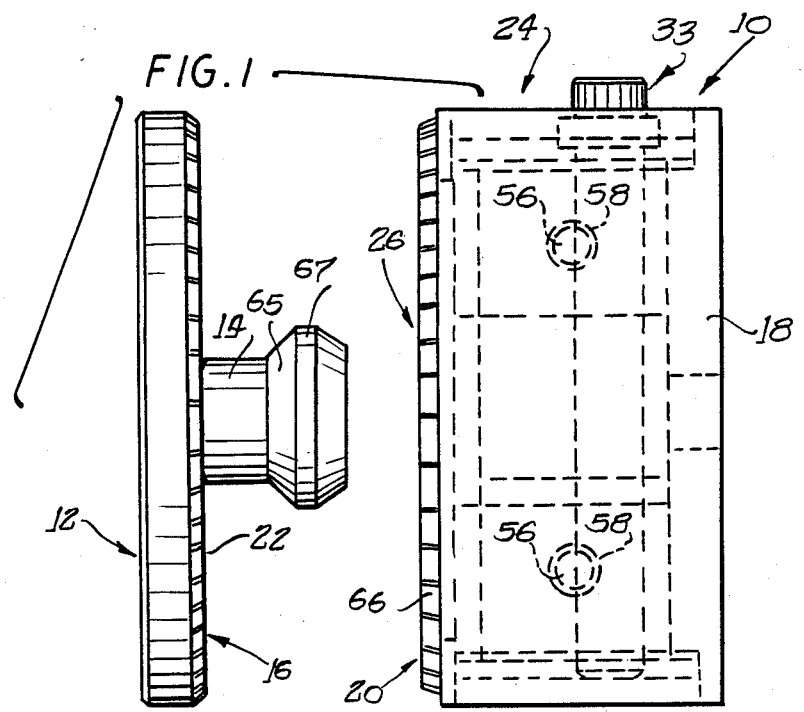
FIG. 1 is a side view of the tool holder retention mechanism and a tool holder positioned for insertion into the retention mechanism.

While this invention is susceptible to embodiment in many different forms, there is shown in the drawings and will be herein described in detail, one specific embodiment with the understanding that the present disclosure is to be considered an exemplification of the principles of the invention, and is not intended to limit the invention to the embodiment illustrated.

It should be noted that dimensional relationships between members of the illustrated embodiment may vary in practice or may have been varied in the illustrations to emphasize certain features of the invention.

FIG. 1 is a side view of a tool holder or workpiece holder retention mechanism 10 and a tool holder or workpiece holder 12 positioned for insertion into the retention mechanism 10. The holder 12 is formed with a holder retention portion 14 which is operatively attached to or formed with a coupling portion 16. The holder retention portion 14 is formed without specific notches since the retention portion is not used to key-in the position of the tool or workpiece mounted to the holder. The holder retention mechanism 10 is comprised of a mechanism housing 18 which has a holder coupling surface 20 for abutting a complementary surface means 22 formed on the coupling portion 16 of the holder 12.

Figure 2:
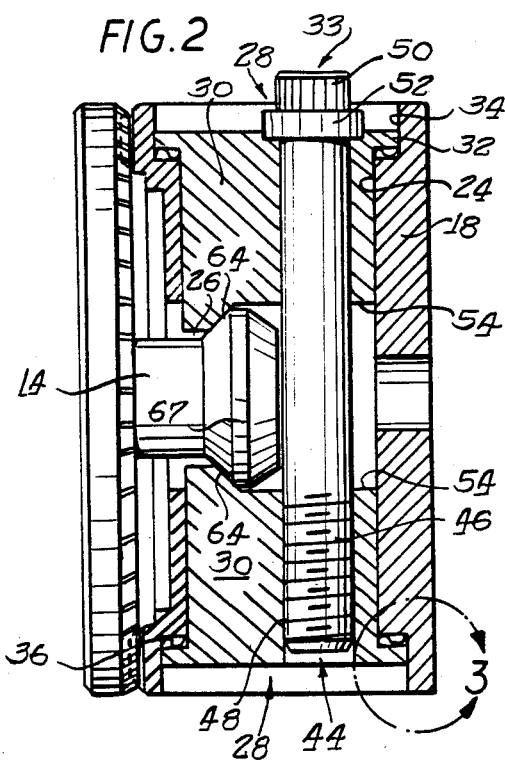
FIG. 2 is a partial sectional view of the tool retention mechanism housing in which a tool holder is retained.

FIG. 2 shows a partial sectional view of the holder retention mechanism 10 in which the holder 12 is retained. In the complete cross sectional view of the mechanism housing 18 shown in FIG. 2, a first or clamping means bore 24 is formed and extends transversely through the mechanism housing 18 and a second or holder retention portion receiving bore 26 extends into the housing concentrically with a central longitudinal axis of the housing 18 and generally perpendicularly to the first bore 24. The first bore 24 is formed and dimensioned for receiving clamping means 28 which create a holder clamping force on the holder retention portion 14. The second bore 26 is dimensioned and shaped for receiving the holder retention portion 14 when it is inserted into the holder retention mechanism 10.

Figure 3:
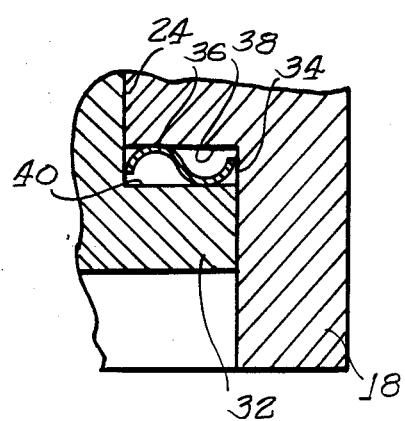
FIG. 3 is an enlargement of the biasing means shown in detail 3 in FIG. 2 which is retained between a lip portion of the jaw members and a counter bore formed in the housing bore.

As shown in FIG. 2, the clamping means 28 comprises a pair of jaw members 30 which are formed with a rim or flange portion 32 and a jaw engaging member or screw 33. The first bore 24 is formed with a counterbore 34 which is sized and dimensioned to cooperatively mate with the rim portion 32 formed on the jaw member 30. As better shown in the enlarged detail in FIG. 3, a biasing means 36 is positioned between an outwardly facing surface 38 of the counterbore 34 and an inwardly facing surface 40 of the rim portion 32. FIG. 3 shows a cross-section of the biasing means 36 which is a wave shaped annular washer with an inside diameter generally slightly greater than the outside diameter of the jaw members 30 and an outside diameter generally slightly smaller than the diameter of the counterbore 34.

Also as shown in FIG. 2, the jaw engaging member or screw 33 projects through the side of the mechanism housing 18 through the jaw members 30 via an engaging member receiving bore 44 formed in each of the jaw members 30. The side accessible position of the clamping means engaging member 42 provides easier installation and adjustment of a holder 14 retained in the retention mechanism 10 than a rear access engaging member. The jaw engaging member 33 is formed at one end with clamping means engaging threads 46 which are formed to engage cooperatively formed jaw member threads 48 which are formed on the inside of the engaging means receiving bore 44. The end of the jaw engaging member 33 opposite the clamping means engaging threads 46 is formed with a head 50 which has a phillips type or straight kerf or some other form of mechanical advantage such as a knurled perimeter. Formed below the head 50, is a shoulder 52 which acts to secure the jaw engaging member 33 at one end of one of the jaw members 30, 30 while the other threaded end engages the clamping means engaging threads 48.

When the head 50 of the jaw engaging member 33 is turned, the jaw means 30 are simultaneously urged towards each other thereby creating a clamping force between mirroredly facing jaw member faces 54. While in the illustrated embodiment, only one jaw member 30 is shown to be threadedly engaged with the jaw engaging member 33 an alternative embodiment has jaw member threads 48 formed in each engaging means receiving bore 44 in a first and second sense such that a jaw engaging member 33, with correspondingly formed clamping means engaging threads 46 acts as a differential screw to tandemly engage the jaw members 30 to simultaneously move the jaws 30 inward or outward depending upon the direction of rotation of the screw 33. However, the illustrated embodiment provides for clamping means engaging threads 46 on only one end of the jaw engaging member 33 and a shoulder 52 on the opposite end to allow the jaw members to floatably move while retaining a tool retention portion 14.

Floatable movement of the engaged jaws 30 is achieved using the biasing means 36 to retain the engaged jaw members 30 in a degree of floatable compression. The biasing means or spring washer 36 is compressed between the inwardly facing surface 40 of the rim portion 32 and the outwardly facing surface 38 of the counterbore 34 such that when the jaw engaging member 33 engages the jaw members 30 the jaw members 30 have a degree of movement relative to the compression of the biasing means 36.

Figure 4:
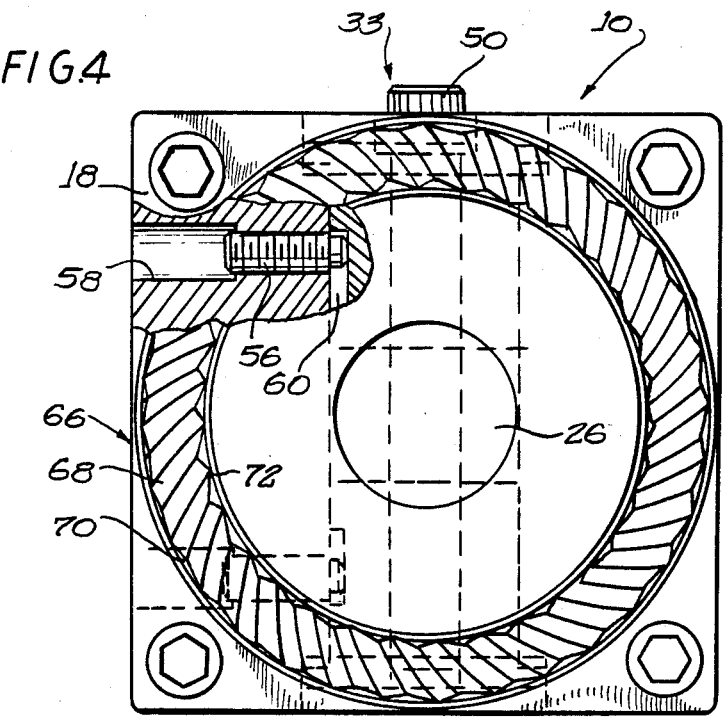
FIG. 4 is an end view of the retention mechanism housing showing the spirally formed coupling teeth and including a partial fragmentary view of a threaded key which mates with a key way on the jaw member to floatingly retain the jaw members.
Figure 6:
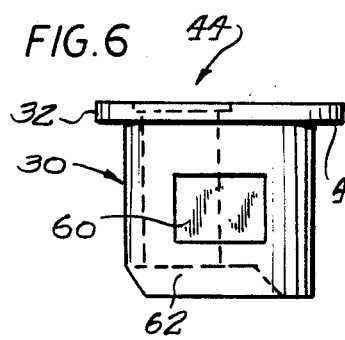
FIG. 6 is a side view of the jaw member shown in FIG. 5 showing the generally rectangular shape of the key way which is formed in the side of the generally cylindrical jaw member with the jaw engaging member bore and the retention portion receiving notch shown in ghost lines.
Figure 5:
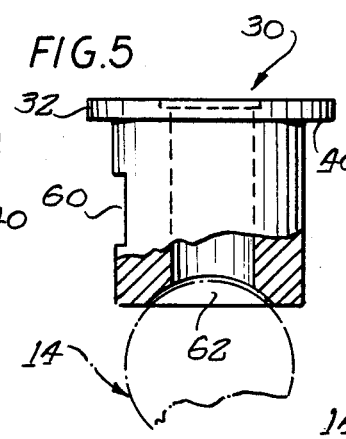
FIG. 5 is a partial fragmentary side view of the jaw member as shown in the ghost lines in FIG. 4 showing the holder retention portion receiving notch.
Figure 7:
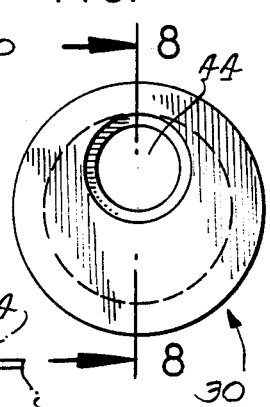
FIG. 7 is a top view of the jaw member showing the generally cylindrical shape and the asymmetric position of the jaw engaging member bore within the jaw member.

As shown in the partial fragmentary view in FIG. 4, the degree of floating movement of the jaw member 30 within the holder retention mechanism 10 is limited by a positioning key 56 which projects through the side of the mechanism housing 18 through a positioning key bore 58. The positioning key 56 is threadedly held in position in the positioning key bore 58 to engage a key way 60 which is formed in the side of the jaw member 30. FIG. 5 and FIG. 6 more clearly show the key way 60 as formed in the side of the jaw member 30. The key way 60 in the illustrated embodiment is generally a rectangular shape which has been notched out of the side of the generally cylindrically shaped jaw member 30. FIG. 7 better shows the cylindrical shape of the jaw member 30 and the asymmetric axial positioning of the clamping means receiving bore 44 relative to the center of the jaw member 30.

Figure 8:
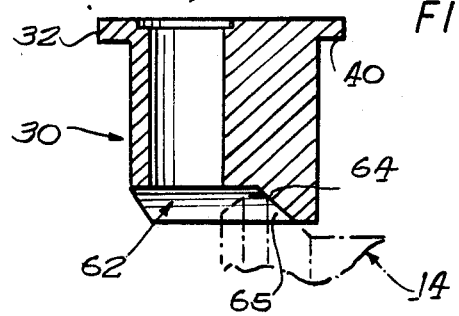
FIG. 8 is a cross sectional view taken along the line 8—8 in FIG. 7 of the jaw member showing a tool retention portion (in ghost lines) engaged in the knob receiving notch.

FIGS. 5, 6, 8 and 9 provide views of a holder retention portion receiving notch 62 which is formed on the mirroredly positioned jaw member faces 54 for engagably urging and securely retaining the holder retention portion 14 when the jaw members 30 are drawn together by the jaw engaging member 33. As shown in the partial fragmentary view of FIG. 5, the notch 62 has a generally circular segmentary cross section which cooperatively mates with the curved shape of the holder retention portion 14. FIG. 6 and 8 show a side view of this radially cut shape and a sloped front edge 64 which is formed on the portion of the notch 62 which is closest to the holder 14 when inserted into the mechanism housing 18. The sloped front edge 64 is angled to cooperatively engage a corresponding sloped portion 65 of a knob or enlargement 67 on the holder retention portion 14.

Figure 9:
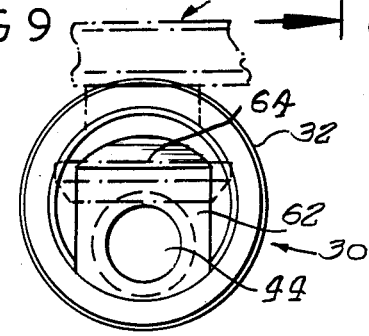
FIG. 9 is a bottom view of the jaw member shown in FIG. 8 illustrating the relationship between the tool retention portion and the knob receiving notch as well as the jaw engaging member bore.

FIG. 9 provides a plan view of the structure in FIG. 8 showing a holder retention portion 14 engaged in the notch 62. While in the illustrated embodiment, the sloped edge 64 is shown as a generally curvedly planar shape, the sloped front edge 64 could be shaped to accommodate other retention portion 14 shapes. The sloped front edge 64 acts against the cooperatively sloped portion 65 of the holder retention portion 14 when a holder retention portion 14 of a holder 12 is inserted into the holder retention mechanism 10 and the jaws 30 are engagedly clamped on the holder retention portion 14 for drawing the face 22 of the holder coupling portion 16 axially against the face 20 of the housing 18. As the holder retention portion 14 is drawn into the second bore 26 clamping forces exerted on the holder retention portion 14 by the jaw members 30, the complementary surface means 22 of the coupling portion 16 engages with spiral surface means 66 of the holder coupling surface 20 and automatically centers the holder with respect to the central axis of the housing 18.

FIG. 4 better illustrates the spiral surface means 66 on the housing. As shown in FIG. 4, the spiral surface means 66 are formed on the surface 20 of the mechanism housing 18 and is comprised of curved teeth 68 in an annular path with that annular path being concentric with the axis of the holder retention portion receiving bore 26. The spiral surface means 66, as illustrated in FIG. 4, are comprised of gear teeth 68 formed on the holder coupling surface 20. The gear teeth 68 are formed in a spiral orientation such that a cross-section of a gear tooth 68 taken at an outside perimeter 70 point of the spiral surface means 66 is larger than a cross-section of the same gear tooth 68 taken at an inside perimeter 72 point of the spiral surface means 66.

The complementary surface means 22 formed on the coupling portion 16 of the holder 12 are generally cooperatively formed gear teeth which meshedly engage with the gear teeth 68 of the spiral surface means 66.

Other specific configurations for the complementary spiral surface means of the surfaces 20 and 22, may suggest themselves and in any event, the holder 12, the combination of the complementary surface means 22 and the spiral surface means 66 provide a high degree of self-centering of the holder 12 when engaged with the retention mechanism 10. Engagement of the complementary surface means 22 and the spiral surface means 66 also provide a means of precision indexing for the tool or workpiece attached to the holder 12.

The holder retention mechanism 10 in combination with the holder 12 provides quick and easy set up and self-centering for a tool or workpiece mounted to the holder 12. The holder 12 is inserted into and retained by the retention mechanism 10 without having to specifically key in the holder 12 with respect to the retention mechanism 10. The spiral surface means 66 together with the complementary surface means 22 allow the holder 12 to be coupled with retention mechanism 10 in any one of the plurality of rotary positions permitted by the spiral surface means 66.

In use, the jaw engaging member 33 is operated to disengage the jaw members 30 to allow passage of a holder retention portion 14 through the bore 26. The holder 12 is positioned to permit the holder retention portion 14 to be inserted into the bore 26, whereby once positioned therein, the jaw engaging member 33 is operated to engage the dual jaw members 30, 30 to apply a clamping force to hold the tool retention portion 14. As the dual jaws 30, 30 are urged towards each other, the sloped edge 64 formed in the holder retention portion receiving notch 62 engages a cooperatively formed sloped edge 65 on the holder retention portion 14 to draw the holder 12 into the retention mechanism 10.

As the holder 12 is drawn into the holder retention mechanism 10 the coupling portion 16 of the holder 12 engages with the holder coupling surface 20 of the mechanism housing 18. As the two coupling surfaces 16, 20 are engaged, the complementary surface means 22 of the coupling portion 16 meshedly engage with the spiral surface means 66 of the holder coupling surface 20. Engagement of the complementary surface means 22 with the gear teeth 68 of the spiral surface means 66 acts to self-center the holder 12 within the holder retention mechanism 10.

Once the jaw members 30 engagedly clamp the holder retention portion 14 to a desired clamping force, the biasing means 36 positioned between the rim portion 32 of the jaw member 30 and the counterbore 34 permit a degree of radial floating engagement of the combined holder 12 and jaw members in the holder retention mechanism 10. The freely floatable action of the jaw members 30 avoid interference with the self-centering function of the spiral surface means 66 and the complementary surface means 22 to permit a high degree of self-centering. It is noted that the diameter of the bore 26 is sufficiently large to avoid interference with the self centering action.

While a preferred embodiment of the present invention is shown and described, it is envisioned that those skilled in the art may devise various modifications of the present invention without departing from the spirit and scope of the appended claims.

The invention claimed is as follows:

1. A holder retention mechanism for a tool holder or workpiece holder which creates a holder clamping force and a self-centering meshing force, said holder including a holder retention portion operatively retainable by said retention mechanism and a coupling portion attached to said holder retention portion for engaging a surface of said holder retention mechanism when said holder is in one of a plurality of rotary positions, said holder retention mechanism comprising: clamping means for retainably engaging said holder retention portion; a mechanism housing positioned about an axis and being formed with a first bore and a second bore, said first bore and said second bore forming a cavity at an intersection of said bores, said first bore being dimensioned and shaped for receiving said clamping means and said second bore being dimensioned and shaped for receiving said holder retention portion, a holder coupling surface formed on said mechanism housing extending radially with respect to said axis, spiral surface means formed on said holder coupling surface in an annular path, said annular path being generally concentric with said axis, said spiral surface means being formed for cooperatively engaging complementary surface means on said coupling portion of said holder; a clamping means engaging member operatively coupled with said clamping means for creating a clamping force in said clamping means when said holder retention portion is inserted into said second bore and said clamping means engaging member is actuated, whereupon said spiral surface means cooperatively engage said coupling portion of said holder for retaining and centering said holder in said holder retention mechanism.

2. A holder retention mechanism according to claim 1 wherein said first bore has a counter bore formed therein for cooperatively receiving a rim portion formed on said clamping means, and said mechanism further including biasing means disposed between said counter bore and said rim portion for retaining said clamping means in floating relationship within said first bore.

3. A holder retention mechanism according to claim 2 in which said biasing means disposed between said counter bore and said rim portion is a wave shaped washer with an inside diameter generally slightly greater than the outside diameter of said clamping means and an outside diameter generally slightly smaller than said counter bore.

4. A holder retention mechanism according to claim 1 in which said generally spiral surface means and said complementary surface means comprise gear teeth formed on said coupling portion and said holder coupling surface which have decreasing cross sectional areas towards said axis for positioning said holder in said retention mechanism.

5. A holder retention mechanism according to claim 1 in which said clamping means comprises two jaw members generally oppositely positioned such that opposed faces of said jaw members are mirroredly positioned, a bore formed through each of said jaw members generally parallel to said first bore for receiving said clamping means engaging member, said clamping means engaging member engaging said two jaw members for urging said jaw members toward each other to create said clamping force on said holder retention portion.

6. A holder retention mechanism according to claim 5 in which each of said two jaws has a holder retention portion receiving notch formed on a surface which abuts said holder retention portion for engagably urging and securely retaining said holder retention portion when said clamping means engaging member engages said jaws to create said clamping force.

7. A holder retention mechanism according to claim 6 wherein said bore in a first of said two jaws is formed without threads and said bore in a second of said two jaws has threads formed therein, and said clamping means engaging member is formed with threads for cooperatively engaging said threads formed in said bore in said second of said two jaws, said jaws and said clamping means engaging member positioned with said clamping means engaging member projecting through said bore in said first of said two jaw members to engage said threads formed in said bore formed in said second of said two jaws.

8. A holder retention mechanism according to claim 5 in which at least one of said jaw members include a key way along a portion of one surface thereof for engaging a positioning key projecting from said mechanism housing/ said key ways being shaped and dimensioned for permitting radial float of said jaw members within said first bore.

9. A retention mechanism for a tool holder or workpiece holder including a coupling portion and a holder retention portion, said holder retention mechanism comprising: a mechanism housing means having a predetermined axis, a first bore extending axially into said housing means and dimensioned for receiving said holder retention portion, a second bore formed in said housing means intersecting said first bore, radially floatable clamping jaw means positioned in said second bore in said housing means for engaging and retaining said holder retention portion, and spiral surface means annularly disposed on said housing means generally concentrically with and extending generally radially with respect to said axis for engaging complementary surface means on said holder coupling portion and centering said holder with respect to said axis when said holder retention portion is retained by said clamping jaw means.

10. A holder retention mechanism according to claim 9 wherein said first bore has a counterbore formed therein for cooperatively receiving a rim portion formed on said clamping jaw means and said mechanism further includes biasing means disposed between a bottom surface of said counterbore and said rim portion for retaining said clamping means in floating relationship within said first bore.

11. A holder retention mechanism according to claim 10 in which said biasing means disposed between said counterbore bottom and said rim portion is a wave shaped washer.

12. A holder retention mechanism according to claim 9 in which said spiral surface means and said complementary surface means comprise gear teeth formed on said coupling portion and said housing means.

13. A holder retention mechanism according to claim 10 in which said clamping jaw means comprises two jaw members generally oppositely positioned such that opposed faces of said jaw members are mirroredly positioned, a bore formed through each of said jaw members generally parallel to said first bore for receiving said clamping means engaging member therethrough, said clamping means engaging member engaging said two clamping jaw means for urging said jaw members toward each other to create said clamping force on said holder retention portion.

14. A holder retention mechanism according to claim 9 in which said jaw members include key ways along a portion of one surface thereof for engaging a positioning key projecting from said mechanism housing, said key ways being shaped and dimensioned for limiting the degree of float of said jaw members within said first bore.

15. A retention mechanism in combination with a holder for a tool or workpiece comprising: mechanism housing means having a predetermined axis, said housing means being formed with a first bore and an axially extending second bore, said second bore dimensioned for receiving said holder; a retention portion formed on said holder and insertable into said axially extending second bore; radially floatable clamping jaw means positioned in said first bore formed in said housing means for operatively engaging and retaining said holder retention portion; a coupling portion with complementary surface means on said holder for engaging a coupling surface on said housing means; and a plurality of spiral surface means on said coupling surface on said housing means, said spiral surface means being disposed in an annular path generally concentric with and extending generally radially with respect to said axis for engaging said complementary surface means on said coupling portion and centering said holder with respect to said axis when said holder retention portion is retained by said clamping jaw means.

16. A holder retention mechanism according to claim 15 in which said spiral surface means and said complementary surface means comprise gear teeth formed on said coupling portion and said housing means which have decreasing cross-sectional areas towards said axis for positioning said holder in said retention mechanism.

* * * * *